US008064599B2

(12) United States Patent
Little (10) Patent No.: US 8,064,599 B2
(45) Date of Patent: Nov. 22, 2011

(54) SECURE MESSAGE TRANSPORT USING MESSAGE SEGMENTATION

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 1119 days.

(21) Appl. No.: 11/897,418

(22) Filed: Aug. 29, 2007

(65) Prior Publication Data
US 2009/0060198 A1 Mar. 5, 2009

(51) Int. Cl.
  *H04K 1/00* (2006.01)
  *H04L 9/00* (2006.01)
  *G06F 7/04* (2006.01)
(52) U.S. Cl. ............. 380/255; 380/277; 380/278; 726/2
(58) Field of Classification Search ........................ None
See application file for complete search history.

(56) References Cited

U.S. PATENT DOCUMENTS

| | | | | | |
|---|---|---|---|---|---|
| 5,751,743 | A | * | 5/1998 | Takizawa | 714/774 |
| 5,912,881 | A | * | 6/1999 | Glaise et al. | 370/252 |
| 6,055,316 | A | * | 4/2000 | Perlman et al. | 380/262 |
| 6,870,874 | B2 | * | 3/2005 | Izumi | 375/132 |
| 6,889,010 | B2 | * | 5/2005 | Trezza | 398/130 |
| 6,922,785 | B1 | * | 7/2005 | Brewer et al. | 713/153 |
| 7,289,516 | B2 | * | 10/2007 | Huckett et al. | 370/395.5 |
| 7,814,211 | B2 | * | 10/2010 | Vernal et al. | 709/227 |
| 2004/0017813 | A1 | * | 1/2004 | Gulati et al. | 370/395.4 |

* cited by examiner

*Primary Examiner* — Kambiz Zand
*Assistant Examiner* — William Powers
(74) *Attorney, Agent, or Firm* — Lowenstein Sandler PC (57) ABSTRACT

Data is divided into a plurality of blocks. A unique identifier is assigned to each of the plurality of blocks. A key is generated that identifies how to reconstruct the data from the plurality of blocks. The key and each of the plurality of blocks are transmitted to a recipient.

21 Claims, 7 Drawing Sheets

SECURE MESSAGE TRANSPORT USING MESSAGE SEGMENTATION

TECHNICAL FIELD

Embodiments of the present invention relate to data security, and more specifically to securing message transport using message segmentation.

BACKGROUND

Communications sent over a network inherently possess a certain level of security risk. Packet sniffers (also known as network analyzers) can intercept and log traffic passing over a wired or wireless network. As data streams travel back and forth over the network, a packet sniffer can capture each packet and eventually decode and analyze the data. Moreover, devices can pose as intended destinations and receive communications that a sender believes are being sent to another party. Therefore, there is a continuing need to improve network security.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for securely transporting messages. In one embodiment, data (e.g., a message) is divided into a plurality of blocks. The data may be divided into an arbitrary number of blocks of arbitrary size. The blocks may each have the same size, or blocks may be differently sized. A unique identifier is assigned to each of the plurality of blocks. A key is generated that identifies how to reconstruct the data from the plurality of blocks. The key and each of the plurality of blocks may then be transmitted to a recipient. Blocks may be transmitted separately, each transmission using the same or a different transport mechanism.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "modifying", "compressing", "determining", "encryptioning" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

Figure 1A:
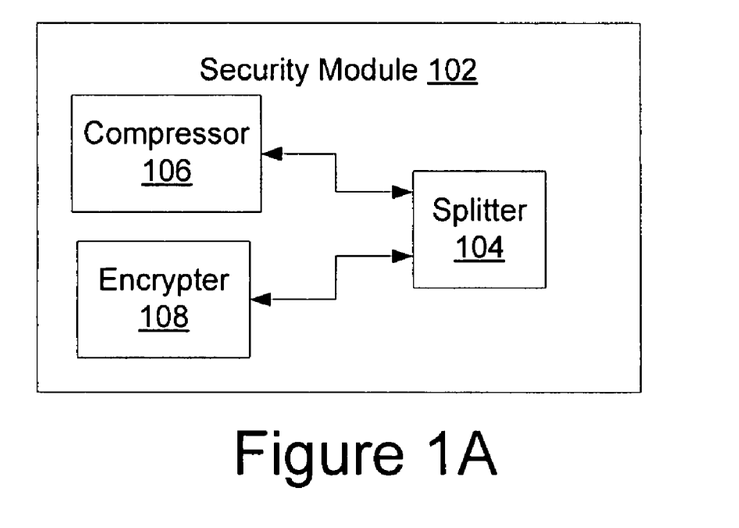
FIG. 1A illustrates a security module, in accordance with one embodiment of the present invention.

FIG. 1A illustrates a security module 102, in accordance with one embodiment of the present invention. The security module 102 modifies data such as messages or other communications in a manner that makes them more difficult to intercept and/or decipher. In one embodiment, the security module 102 includes a splitter 104. In further embodiments, the security module 102 also includes a compressor 106 and/or an encrypter 108 connected with the splitter 104.

Splitter 104 divides data into smaller pieces, referred to herein as blocks. The number and size of blocks into which the data is divided may vary. In one embodiment, a user may select the size of each block, and the splitter 104 may determine the number of blocks to divide the data into based on a size of the data. In another embodiment, a user may select a number of blocks to divide the data into, and the splitter 104 may determine a size for each of the blocks based on a size of the data. Alternatively, the splitter 104 may automatically determine a number and/or size of blocks based on, for example, a security setting or other criteria. A high security setting may cause data to be divided into a large number of small blocks, while a low security setting may cause the data to be divided into a small number of large blocks. For example, twenty bytes of data may be divided into 20 one-byte blocks if a security setting is high, and into 4 five byte blocks if a security setting is low.

In one embodiment, splitter 104 divides the data into equally sized blocks. In another embodiment, splitter 104 divides the data into differently sized blocks. For example, some blocks may have 4 bits, some may have 6 bits, some may have 8 bits, etc. If splitter 104 is set to divide data into differently sized blocks, a security setting may specify a maximum block size and/or a minimum block size. Alternatively, a user may manually input block sizes.

In one embodiment, splitter 104 divides data into blocks on sentence boundaries. In another embodiment, splitter 104 divides data into blocks on word boundaries. Alternatively, other boundaries may be established for determining how data should be divided.

Splitter 104 may assign a unique identifier to each block. The unique identifier may be an alphanumeric value, a signed or unsigned integer, etc. In one embodiment, the unique identifier includes a total blocks value. A simplified example of such a unique identifier is block 5 of 10. Alternatively, no total blocks value may be included in the unique identifier. In one embodiment, the unique identifiers are not sequentially numbered. In one embodiment, the unique identifiers are randomly (or pseudo randomly) assigned. Therefore, even if all the blocks are intercepted, an interceptor still will not know how the blocks should be combined. If the unique identifier does not include a total blocks value, an interceptor would also not know whether all of the blocks have been received.

Splitter 104 may generate a combination key that is used to reconstruct the data from the blocks. The combination key may specify an order of combination for the blocks based on the unique identifiers of the blocks. For example, the combination key may specify that block 214 is the first block, block 1 is the second block, etc. The combination key may also specify a total number of blocks.

In one embodiment, splitter 104 divides the combination key into multiple combination key segments. A second combination key may then be generated that specifies how to reconstruct the combination key from the combination key segments. Alternatively, the combination key may be divided into sequentially labeled combination key segments such that combination key segment one is always first, combination key segment two is always second, and so on. Thus, no second combination key may be necessary to reconstruct the first combination key. Breaking up the combination key into multiple combination key segments may further increase security without significantly increasing overhead.

In one embodiment, compressor 106 compresses data before it is divided up into multiple blocks by splitter 104. In another embodiment, compressor 106 may compress one or more of the multiple blocks after splitter 104 has divided the data. However, compression of the blocks may be less efficient than compression of the data, because there is less information from which patterns can be determined.

Data may be compressed using any encoding scheme, such as run length encoding, entropy encoding, fractal compression, vector quantization, Lempel-Ziv (LZ) compression (e.g., as used to generate gunzip and png files), Lempel-Ziv-Welch (LZW) compression (e.g., used in gif images), Lempel-Ziv-Renau (LZR) compression (e.g., as used to generate zip files), etc. Compressor 106 may also archive multiple articles of data by combining the articles of data into a single file and then compressing that file. The compression may be lossy compression or lossless compression, depending on a setting of the security module 102. A lossy compression scheme may be used if some loss of fidelity is acceptable.

Compression may reduce consumption of transmission bandwidth, at the expense of having to decompress the compressed data before it can be viewed. Compression may also increase security of the data because a method that was used to compress the data generally needs to be known to decompress the data. Therefore, a party that intercepts a compressed message still needs to decompress the message using the proper compression technique before it can be viewed.

In one embodiment, encrypter 108 encrypts data before it is divided up into multiple blocks by splitter 104. In another embodiment, encrypter 108 encrypts some or all of the multiple blocks after the data has been divided. In yet another embodiment, encrypter 108 may perform a first encryption to encrypt the data before it is divided, and perform a second encryption to further encrypt the blocks after the data is divided. Data may be encrypted using any encryption scheme, such as a transposition cipher, substitution cipher, block cipher, stream cipher, or a combination thereof. Examples of ciphers include the data encryption standard (DES), advanced encryption standard (AES), twofish, blowfish, serpent, CAST5, international encryption algorithm (IDEA), etc.

Encrypter 108 uses an encryption key (or multiple encryption keys) to encrypt the data and/or blocks. The same encryption key (or keys) must then be used to decrypt the data and/or blocks. In one embodiment, the encryption key is combined with the combination key to generate a combined key. The combined key may be used to decrypt the blocks, reconstruct the data from the blocks and/or decrypt the data. Alternatively, the encryption key and combination key may remain separate. In one embodiment, if the data is divided into small enough blocks, no encryption may be necessary.

In one embodiment, security module 102 is an application that includes procedures to perform the functions of the splitter 104, compressor 106 and encrypter 108. Alternatively, security module 102 may make calls to other applications to perform the functions of one or more of the splitter 104, compressor 106 and encrypter 108. For example, security module 102 may make calls to a compression program (e.g., Pkzip®, Stuffit®, gunzip, etc.) to compress the data, and calls to an encryption program (e.g., truecrypt, Pretty Good Privacy®, etc.) to encrypt the data.

Figure 1B:
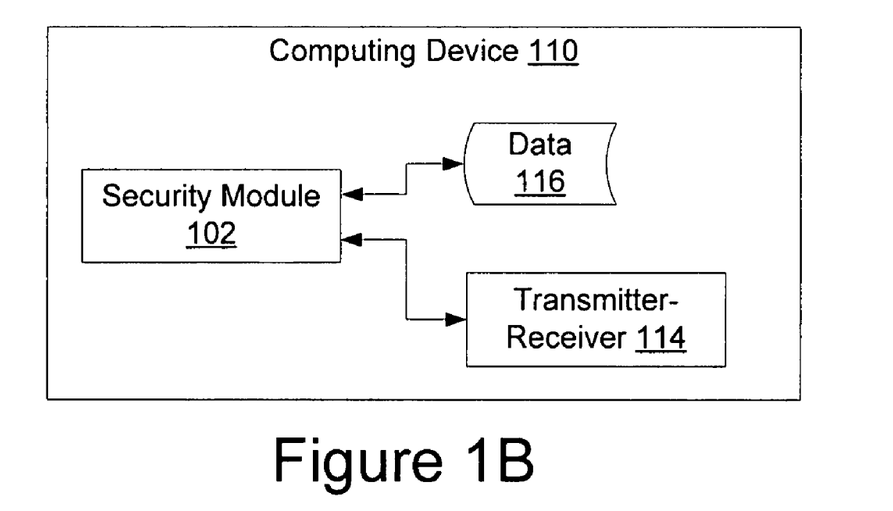
FIG. 1B illustrates an exemplary computing device, in accordance with one embodiment of the present invention.

FIG. 1B illustrates an exemplary computing device 110, in accordance with one embodiment of the present invention. The computing device 110 includes security module 102 connected with data 116 and a transmitter-receiver 114. The data 116 may be stored in memory such as volatile memory (e.g., read-only memory (ROM), flash memory, dynamic random access memory (DRAM) such as synchronous DRAM (SDRAM) or Rambus DRAM (RDRAM), etc.), static memory (e.g., flash memory, static random access memory (SRAM), etc.), a hard disk drive, an optical drive, etc. The data 116 may be stored in local memory (as illustrated), or external memory (e.g., an external hard drive).

In one embodiment, security module 102 is a hardware component of computing device 110. Alternatively, security module 102 may include software that is part of an operating system, an application, or a combination thereof. Security module 102 may also be a combination of software and hardware.

Security module 102 accesses data 116, and encrypts, compresses and/or splits the data 116 into multiple blocks. Security module 102 also generates one or more keys for the data 116. The blocks and keys are then forwarded to transmitter-receiver 114.

Transmitter-receiver 114 may transmit and receive messages or other communications via multiple transport mechanisms. Examples of transport mechanisms that transmitter-receiver 114 may use include hypertext transfer protocol (HTTP), file transfer protocol (FTP), email, java message service (JMS), instant message (IM), short message service (SMS), etc. In one embodiment, transmitter-receiver 114 uses multiple transport mechanisms to transmit the blocks to a recipient. For example, some blocks may be transmitted using email, some blocks using HTTP, some blocks using JMS, etc. Therefore, it may be more difficult for a third party to intercept all of the blocks. Moreover, even if all of the blocks are intercepted, the interceptor may not know that all of the blocks are part of the same message. This may increase the security of sending messages over a network.

Figure 1C:
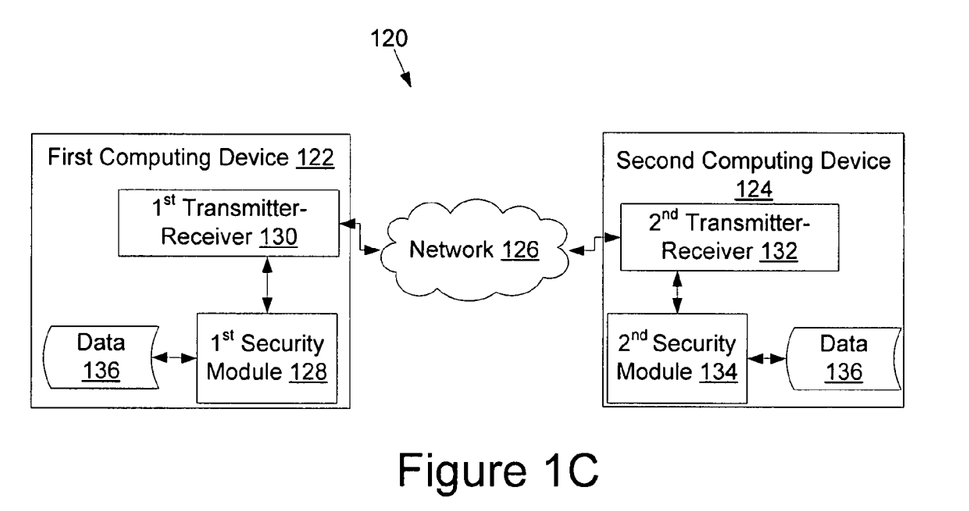
FIG. 1C illustrates an exemplary network architecture, in which embodiments of the present invention may operate.

FIG. 1C illustrates an exemplary network architecture 120, in which embodiments of the present invention may operate. The network architecture 120 may include a first computing device 122 connected to a second computing device 124 via a network 126, which may be a public network (e.g., Internet) or a private network (e.g., Ethernet or a local area Network (LAN)).

First computing device 122 and second computing device 124 may be personal computers (PCs), servers, personal data assistants (PDAs), cellular phones, etc. First computing device 122 and/or second computing device 124 may be connected with one or more additional computing devices (not shown), and may provide data security services to the additional computing devices. Therefore, it may not be necessary for the additional computing devices to include a security module.

The first computing device 122 may include a first transmitter-receiver 130, a first security module 128 and data 136. The second computing device 124 may include a second transmitter-receiver 132, a second security module 134 and data 136. In one embodiment, the first security module 128 and second security module 134 are each examples of security module 102 of FIG. 1A. First security module 128 encrypts, divides and/or compresses data into multiple blocks 136. First security module 128 also generates one or more keys for decrypting and/or reconstructing data from the blocks. First security module 128 then forwards the blocks and keys to the first transmitter-receiver 130.

First transmitter-receiver 130 sends the blocks and keys over the network 126 to the second transmitter-receiver 132 of the second computing device 124. The blocks and keys may be sent to the second transmitter-receiver 132 using multiple transport mechanisms. In one embodiment, first transmitter-receiver 130 makes calls on different network applications to transmit the blocks and keys. Examples of network applications include those that communicate using file transfer protocol (ftp), telnet, email, instant messaging, hyper text transfer protocol (HTTP), etc. Alternatively, first transmitter-receiver 130 may include procedures for transmitting messages via some or all available transport mechanisms.

In one embodiment, a time delay is applied between blocks and/or keys that are transmitted using the same transport mechanism. Therefore, for example, if two blocks are sent via HTTP, the second block may be sent seconds, minutes, or hours after the first block. This may further secure messages sent over a network.

In one embodiment, first transmitter-receiver 130 requests validation from second transmitter-receiver 132 before sending blocks and keys. Validation may include login information (e.g., username and password), use of a digital certificate, or other standard validation techniques. If second transmitter-receiver 132 cannot successfully validate second computing device 124, first transmitter-receiver 130 may not send any blocks or keys to it.

Second transmitter-receiver 132 receives the keys and blocks via one or more transport mechanisms. If not all blocks are received, or a key is not received, second transmitter-receiver 132 may send a message to first transmitter-receiver 130 requesting that the unreceived blocks and/or keys be retransmitted. First transmitter-receiver 130 may then retransmit the requested blocks and/or keys. In one embodiment, the retransmission uses a different transport mechanism (or transport mechanisms) than was originally used to transmit the unreceived blocks and/or keys.

In one embodiment, once all blocks and keys are received, second transmitter-receiver 132 forwards them to second security module 134. Second security module 134 may then use the keys to reconstruct, decompress and/or decrypt the data. Alternatively, second transmitter-receiver 132 may forward the blocks and keys to second security module 134 as they are received. Therefore, second security module 134 may begin decompressing, decrypting and/or combining blocks as they are received. Once data 136 has been reconstructed, decrypted and/or decompressed, it may be viewed, stored in memory, and/or otherwise acted upon.

In order for second security module 134 to properly reconstruct the data from the multiple blocks, the first computing device 122 and second computing device 124 must each understand how the data was split. This may be provided by a combination key. Likewise, the first computing device 122 and second computing device 124 should both understand any compression, archival and/or encryption scheme that was used. In one embodiment, if this information is not included in a key, then there needs to be a previous understanding between the first computing device 122 and second computing device 124 on what compression and/or encryption means are to be used.

In one embodiment, the present invention may be implemented in a distributed computing environment that includes a service oriented architecture (SOA; an information system architecture that organizes and uses distributed capabilities (services) for one or more applications). The distributed computing environment may include clients and services connected via a network. The network may include an enterprise service bus (ESB; an event-driven and standards-based messaging engine that provides an infrastructure that links together services and clients to enable distributed applications and processes). The ESB may be a single bus that logically interconnects all available services and clients, or may include multiple busses, each of which may logically interconnect different services and/or clients.

Figure 2:
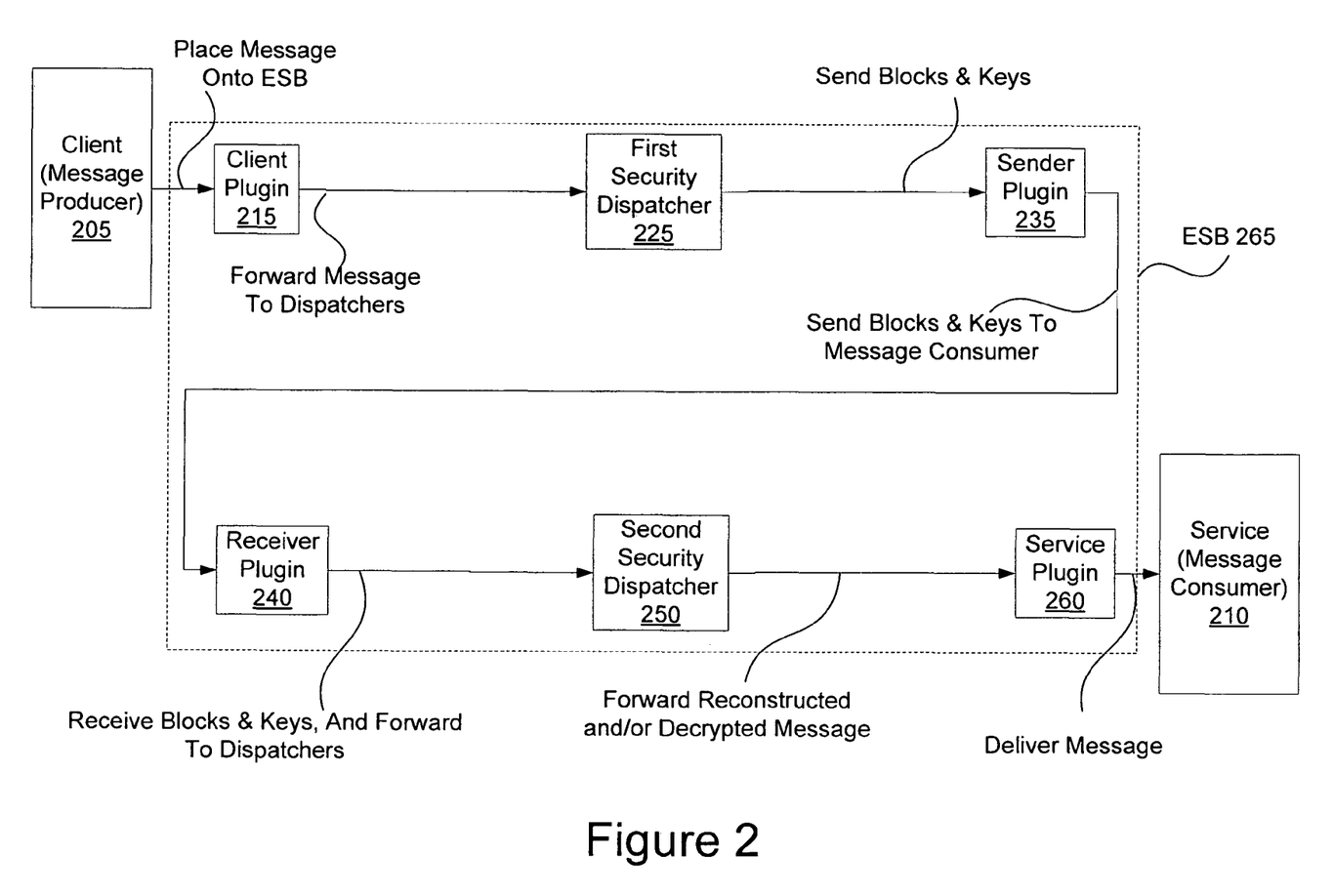
FIG. 2 is a data flow diagram illustrating a message flowing through an ESB, in accordance with one embodiment of the present invention.

FIG. 2 is a data flow diagram illustrating a message flowing through an ESB, in accordance with one embodiment of the present invention. The message originates at a client 205, which in the illustrated embodiment is a message producer, and is addressed to a service 210, which in the illustrated embodiment is a message consumer.

Client 205 may be, for example, a personal computer (PC), palm-sized computing device, personal digital assistant (PDA), etc. Client 205 may also be an application run on a PC, server, database, etc. Client 205 generates a message body, and places the message body onto the ESB 265 by sending the message body to client plugin 215. If the message had been addressed to a service other than service 210, the message might have been placed onto the ESB 265 by sending it to a different client plugin.

The client plugin 215 operates as an interface between the client 205 and the ESB 265. In one embodiment, the client plugin 215 exclusively handles messages directed to service 210. Alternatively, other client plugins may also handle messages directed to service 210. Client plugin 215 adds a header and context to the message body to create a full message, and forwards the message to first security dispatcher 225.

In one embodiment, first security dispatcher 225 corresponds to security module 102 of FIG. 1A. First security dispatcher 225 divides the message into multiple blocks. In one embodiment, first security dispatcher 225 compresses and/or encrypts the message before it is divided into blocks. In another embodiment, first security dispatcher 225 encrypts and/or compresses the blocks after the message has been divided. Alternatively, first security dispatcher 225 may encrypt and/or compress the data both before an after the data is divided. First security dispatcher 225 may generate a combination key for reconstructing the message from the blocks, a first encryption key for decrypting the message, and an additional encryption key or keys for decrypting the blocks. First security dispatcher 225 then sends the blocks and keys to sender plugin 235.

Sender plugin 235 transmits the keys and blocks to receiver plugin 240 of service 210. In one embodiment, sender plugin 235 transmits the keys and blocks using different transport mechanisms. For example, some blocks may be transmitted using HTTP, and some blocks may be transmitted using email, etc.

In one embodiment, each of client plugin 215, first security dispatcher 225, and sender plugin 235 are collocated with client 205. Thereby, these dispatchers and plugins may occupy the same address space (e.g., share the same java virtual machine) as the client 205 for maximum efficiency and minimum overhead. Though the dispatchers and plugins may occupy the same address space as client 205, each may be a separate addressable service. In another embodiment, one or more of the dispatchers and plugins may be external to client 205.

Receiver plugin 240 is a dispatcher that receives the blocks and keys directed to service 210, and passes them to dispatchers (e.g., to second security dispatcher 250). In one embodiment, receiver plugin 240 receives the blocks and keys via different transport mechanisms. To properly receive each of the blocks and keys, receiver plugin 240 may monitor multiple ports and/or network applications of service 210. For example, receiver plugin 240 may monitor incoming email, incoming HTTP messages, incoming JMS messages, etc. In one embodiment, the client 205 and service 210 agree what transport mechanisms will be used to transmit messages before any messages are exchanged. This enables the receiver plugin 240 to monitor appropriate ports and/or network applications for receipt of blocks and keys. Receiver plugin 240 forwards received blocks and keys to second security dispatcher 250.

In one embodiment, receiver plugin 240 notes unique identifiers of each received block. In a further embodiment, receiver plugin 240 stores received blocks and keys in a shared store that is shared between the different transport mechanisms (e.g., between different network applications). If one or more blocks are not received, receiver plugin 240 may automatically send a message to sender plugin 235 requesting that the unreceived blocks be resent. Receiver plugin 240 may also request that unreceived keys be resent. Preferably, the unreceived blocks and/or keys are resent by a different transport mechanism than was originally used to send them.

In one embodiment, second security dispatcher 250 corresponds to security module 102 of FIG. 1A. Second security dispatcher 250 uses the received keys to decrypt the received blocks (if they are encrypted), to combine the blocks to reconstruct the message, and to decompress and/or decrypt the message. Preferably, first security dispatcher 225 and second security dispatcher 250 are substantially the same, such that they each use the same ciphers for encryption and decryption, the same compression techniques, and the same message splitting algorithms. In one embodiment, in which the first security dispatcher 225 is not the same as the second security dispatcher 250, received keys identify ciphers, compression techniques and/or splitting algorithms that were used to produce the blocks. Once the message has been reconstructed, decrypted and/or decompressed, it is forwarded to service plugin 260.

Service plugin 260 removes the context and header from the message, and delivers the message body to service 210, thereby removing the message from the ESB 265. Service 210 may then take appropriate action based on the message body.

Service 210 may be a discretely defined set of contiguous and autonomous functionality (e.g., business functionality, technical functionality, etc.). Service 210 may be resident on a personal computer (PC), server, router, etc. Service 210 may represent a process, activity or other resource that can be accessed and used by other services or clients on ESB 265.

In one embodiment, client 205 and service 210 are each connected with and/or include additional dispatchers. For example, the client plugin 215 may be connected with a first transaction dispatcher to append transaction information to the message, and the service plugin 260 may be connected with a second transaction dispatcher to remove the transaction information from the message.

In one embodiment, each of service plugin 260, second security dispatcher 250, and receiver plugin 240 are collocated with service 210. Thereby, these dispatchers and plugins may occupy the same address space as the service 210 for maximum efficiency and minimum overhead. Though the dispatchers and plugins may occupy the same address space as service 210, each may be a separate addressable service. In another embodiment, one or more of the dispatchers and plugins may be external to service 210.

Figure 3:
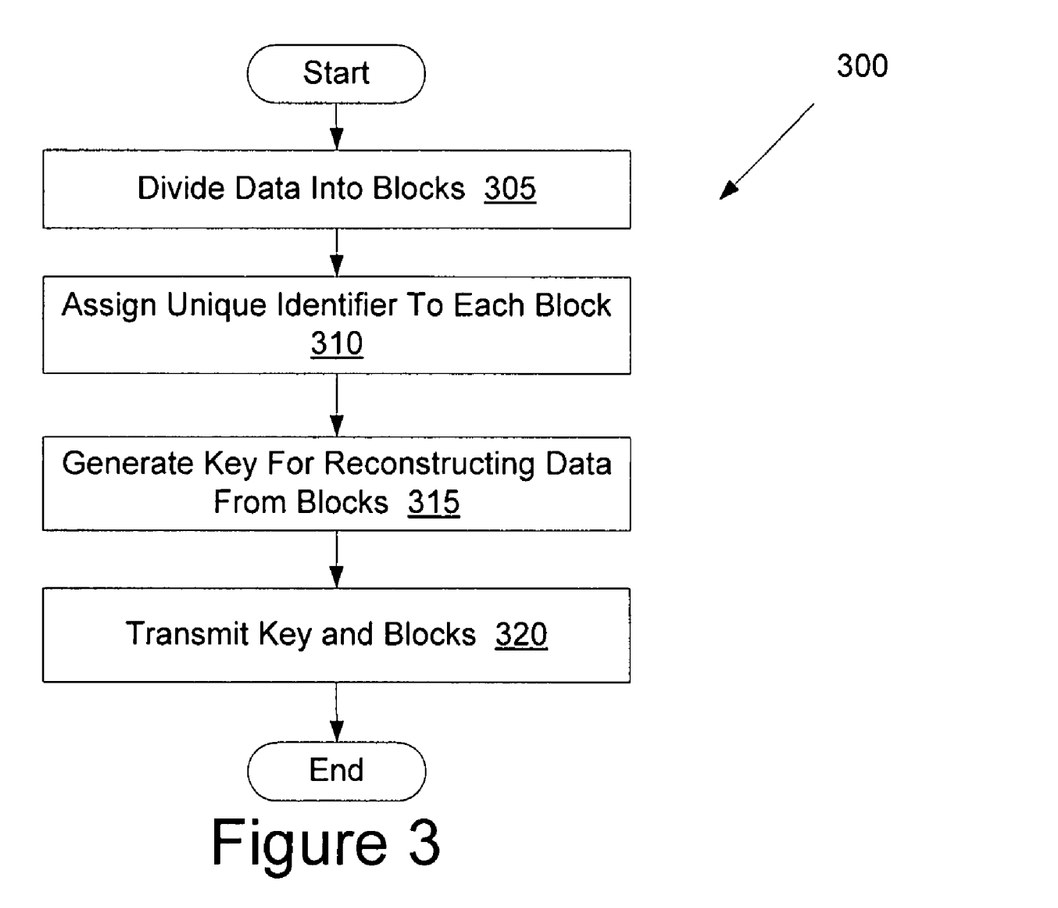
FIG. 3 illustrates a flow diagram of one embodiment for a method of transmitting data.

FIG. 3 illustrates a flow diagram of one embodiment for a method 300 of transmitting data. The method may be performed by processing logic that may comprise hardware (e.g., circuitry, dedicated logic, programmable logic, microcode, etc.), software (such as instructions run on a processing device), or a combination thereof. In one embodiment, method 300 is performed by security module 102 of FIG. 1A.

Referring to FIG. 3, method 300 includes dividing data into blocks (block 305). Data may be divided into an arbitrary number of blocks of arbitrary size. The blocks may be equally sized, or they may have different sizes. At block 310, a unique identifier is assigned to each block. The unique identifier may or may not identify the total number of blocks into which the data has been divided. At block 315, a key is generated for reconstructing the data from the blocks.

At block 320, the blocks and the key are transmitted to a recipient. In one embodiment, the key and some or all of the blocks are transmitted using different transport mechanisms. Alternatively, all of the blocks and the key may be transmitted using the same transport mechanism.

Figure 4:
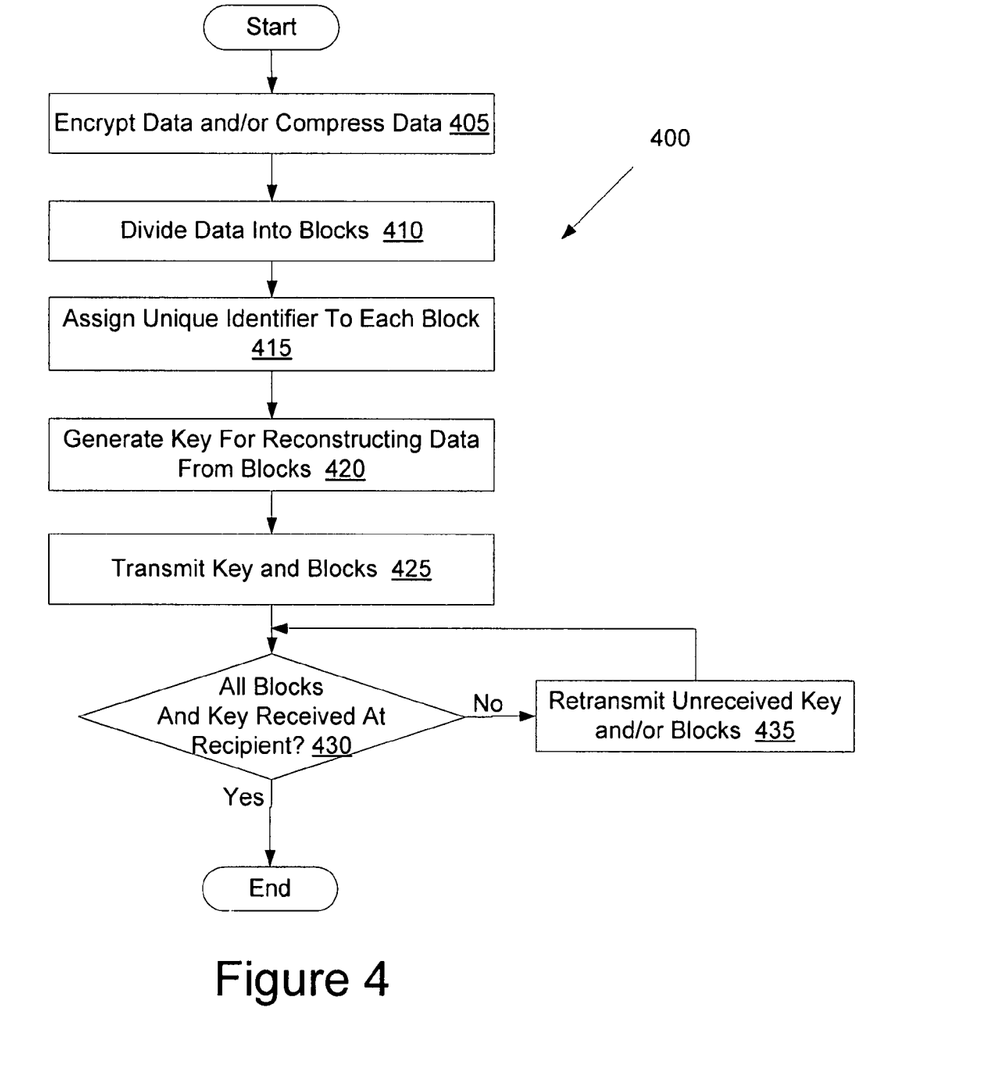
FIG. 4 illustrates a flow diagram of another embodiment for a method 400 of transmitting data.

FIG. 4 illustrates a flow diagram of another embodiment for a method 400 of transmitting data. The method may be performed by processing logic that may comprise hardware (e.g., circuitry, dedicated logic, programmable logic, microcode, etc.), software (such as instructions run on a processing device), or a combination thereof. In one embodiment, method 400 is performed by security module 102 of FIG. 1A.

Referring to FIG. 4, method 400 includes encrypting and/or compressing data (block 405). The data may be compressed into, for example, an rar, pkz, zip, arj, or other compression format. The data may be compressed using a lossless compression technique, or using a lossy compression technique. Data may be encrypted using, for example, DES, AES, or other ciphers. An encryption key may be used to encrypt the data.

At block 410, data may be divided into an arbitrary number of blocks of arbitrary size. The blocks may be equally sized, or they may have different sizes. At block 415, a unique identifier is assigned to each block. The unique identifier may or may not identify the total number of blocks into which the data has been divided. At block 420, a combination key is generated for reconstructing the data from the blocks.

At block 425, the blocks and the keys are transmitted to a recipient. In one embodiment, the keys and some or all of the blocks are transmitted using different transport mechanisms. Alternatively, all of the blocks and the key may be transmitted using the same transport mechanism. In one embodiment, it is assumed that a recipient and sender of the data have previously agreed upon an encryption key. Therefore, the encryption key does not need to be transmitted.

At block 430, processing logic determines whether all blocks and keys were received by the recipient. In one embodiment, it is assumed that the client has received all blocks and keys if no requests for retransmission are received from the client. If the recipient has not received all the blocks and/or keys, the method proceeds to block 435, and the unreceived blocks and/or keys are retransmitted. If the recipient has received all of the blocks and keys, the method ends.

Figure 5:
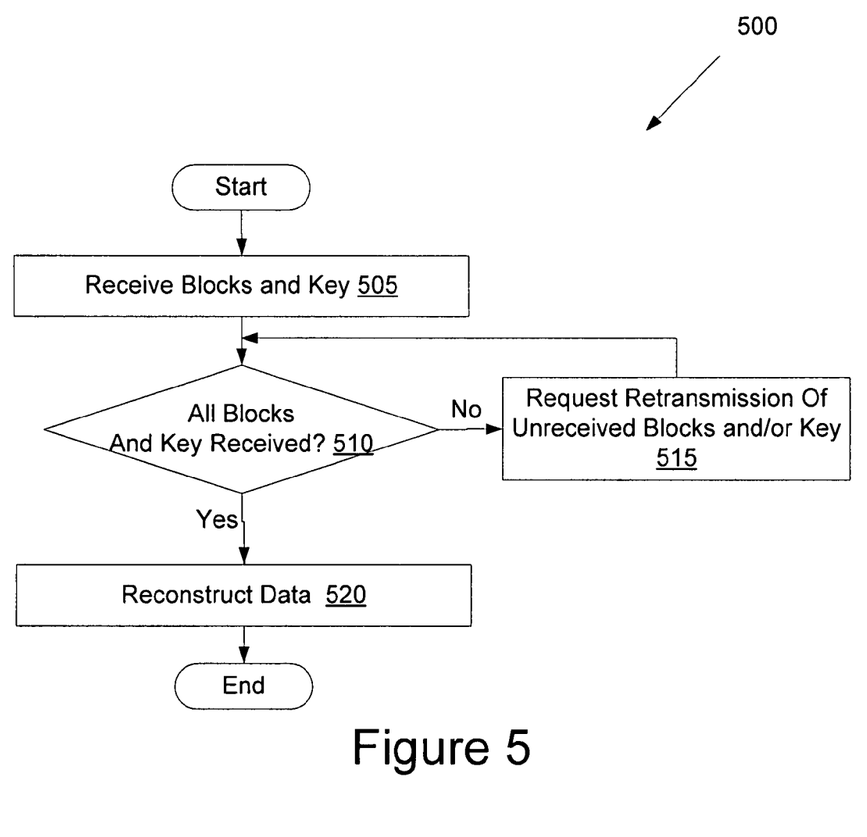
FIG. 5 illustrates a flow diagram of one embodiment for a method of reconstructing data.

FIG. 5 illustrates a flow diagram of one embodiment for a method 500 of reconstructing data. The method may be performed by processing logic that may comprise hardware (e.g., circuitry, dedicated logic, programmable logic, microcode, etc.), software (such as instructions run on a processing device), or a combination thereof. In one embodiment, method 500 is performed by security module 102 of FIG. 1A.

Referring to FIG. 5, method 500 includes receiving blocks and a key (or keys). The blocks and key may all be received by the same or by different transport mechanisms. At block 510, processing logic determines whether all of the blocks and key have been received. If not all of the blocks and key have been received, the method proceeds to block 515. If all of the blocks and key have been received, the method continues to block 520.

At block 515, processing logic requests the retransmission of the unreceived blocks and/or key. The method then continues to block 510, and it is again determined if all blocks and the key have been received.

A block 520, data is reconstructed from the received blocks and key. Reconstructing the data may include decrypting the blocks, combining the blocks to form the data, decrypting the data, and/or decompressing the data. The data may then be viewed, stored, and/or otherwise acted upon by processing logic.

It should be noted that though the blocks of FIGS. 3, 4 and 5 appear in a particular order, the present invention is not limited to the order shown. For example, though block 405 of FIG. 4 is shown before block 410, it is equally acceptable to first perform the actions of block 410 (dividing the data), and then perform the actions of block 405 (encrypting/compressing the data). In this example, the blocks into which the data is divided in block 410 could each be encrypted at block 405.

Figure 6:
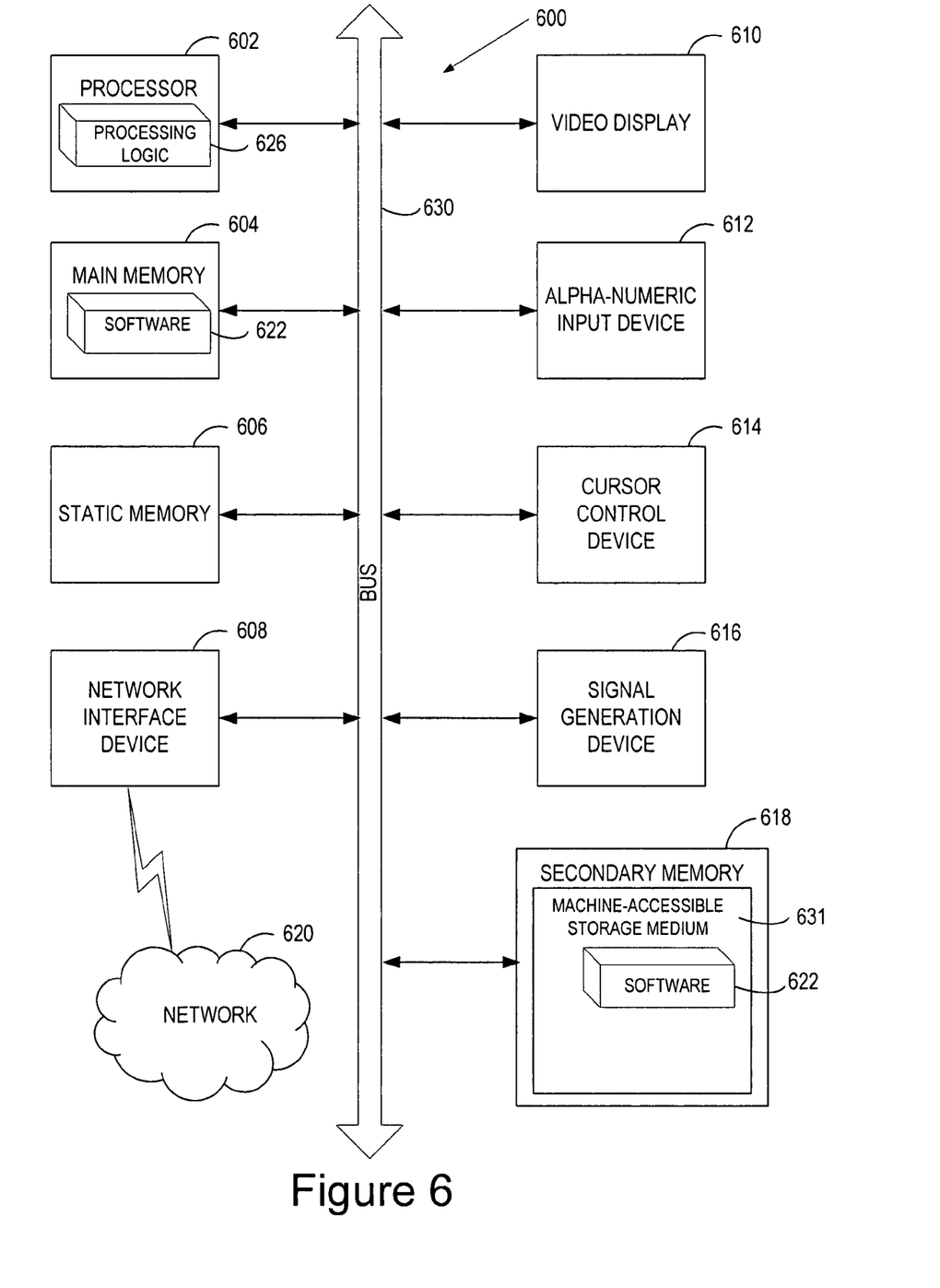
FIG. 6 illustrates a diagrammatic representation of a machine in the exemplary form of a computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 631 on which is stored one or more sets of instructions (e.g., software 622) embodying any one or more of the methodologies or functions described herein. The software 622 may also reside, completely or at least partially, within the main memory 604 and/or within the processor 602 during execution thereof by the computer system 600, the main memory 604 and the processor 602 also constituting machine-accessible storage media. The software 622 may further be transmitted or received over a network 620 via the network interface device 608.

The machine-accessible storage medium 631 may also be used to store data structure sets that define user identifying states and user preferences that define user profiles. Data structure sets and user profiles may also be stored in other sections of computer system 600, such as static memory 606.

While the machine-accessible storage medium 631 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer implemented method comprising:
   dividing data into a plurality of blocks;
   assigning a unique identifier to each of the plurality of blocks;
   generating a key that identifies how to reconstruct the data from the plurality of blocks; and
   transmitting the key and each of the plurality of blocks to a recipient, wherein a first block of the plurality of blocks is transmitted using a first transport mechanism selected from a group consisting of hypertext transport protocol (HTTP), file transport protocol (FTP), email, java message service (JMS), instant message (IM) and short message service (SMS), and wherein a second block of the plurality of blocks is transmitted separately from the first block using a second transport mechanism that is different from the first transport mechanism.

2. The method of claim 1, further comprising:
   performing at least one of encrypting the data, encrypting the plurality of blocks, compressing the data, and compressing the plurality of blocks.

3. The method of claim 1, further comprising:
   receiving a notification from the recipient that the first block of the plurality of blocks was not received; and
   retransmitting the first block to the recipient via a different transport mechanism than was originally used to transmit the first block to the recipient.

4. The method of claim 1, further comprising:
   receiving a user selection of a block size; and
   determining a number of blocks to divide the data into based on a size of the data and based on the block size, wherein the plurality of blocks consists of the determined number of blocks.

5. The method of claim 1, further comprising:
   receiving a user selection of a number of blocks to divide the data into; and
   determining a block size based on the number of blocks and based on a size of the data.

6. The method of claim 1, wherein the unique identifier includes a total blocks value.

7. The method of claim 1, wherein the data is divided into the plurality of blocks on at least one of sentence boundaries or word boundaries.

8. The method of claim 1, further comprising:
   dividing the key into a plurality of key segments;
   generating a second key that identifies how to reconstruct the key from the plurality of key segments; and
   transmitting the second key and the plurality of key segments to the recipient.

9. A computer implemented method comprising:
   receiving a first plurality of blocks via a first transport mechanism selected from a group consisting of hypertext transport protocol (HTTP), file transport protocol (FTP), email, java message service (JMS), instant message (IM) and short message service (SMS), each block of the first plurality of blocks having a unique identifier and being received independently of others of the plurality of blocks;
   receiving a second plurality of blocks via a second transport mechanism that is different from the first transport mechanism;
   receiving a key that identifies how to reconstruct data from the first plurality of blocks and the second plurality of blocks; and
   reconstructing the data from the first plurality of blocks and the second plurality of blocks using the key.

10. The method of claim 9, further comprising:
    decompressing the data if the data is compressed;
    decrypting the data if the data is encrypted;
    decompressing the first plurality of blocks and the second plurality of blocks if the first plurality of blocks and the second plurality of blocks are compressed; and
    decrypting the first plurality of blocks and the second plurality of blocks if the first plurality of blocks and the second plurality of blocks are encrypted.

11. The method of claim 9, further comprising:
    requesting that at least one block of the first plurality of blocks and the second plurality of blocks be retransmitted using a third transport mechanism that is different from the first transport mechanism and the second transport mechanism.

12. The method of claim 9, further comprising:
    monitoring at least one of a first port or a first network application to detect blocks transmitted using the first transport mechanism; and
    monitoring at least one of a second port or a second network application to detect blocks transmitted using the second transport mechanism.

13. A non-transitory computer readable medium including instructions that, when executed by a computer, cause the computer to perform a method comprising:
    dividing data into a plurality of blocks;
    assigning a unique identifier to each of the plurality of blocks;
    generating a key that identifies how to reconstruct the data from the plurality of blocks; and
    transmitting the key and each of the plurality of blocks to a recipient, wherein a first block of the plurality of blocks is transmitted using a first transport mechanism selected from a group consisting of hypertext transport protocol (HTTP), file transport protocol (FTP), email, java message service (JMS), instant message (IM) and short message service (SMS), and wherein a second block of the plurality of blocks is transmitted separately from the first block using a second transport mechanism that is different from the first transport mechanism.

14. The non-transitory computer readable medium of claim 13, the method further comprising:
performing at least one of encrypting the data, encrypting the plurality of blocks, compressing the data, and compressing the plurality of blocks.

15. The non-transitory computer readable medium of claim 13, the method further comprising:
receiving a notification from the recipient that the first block of the plurality of blocks was not received; and
retransmitting the first block to the recipient via a different transport mechanism than was originally used to transmit the first block to the recipient.

16. A non-transitory computer readable medium including instructions that, when executed by a computer, cause the computer to perform a method comprising:
receiving a first plurality of blocks via a first transport mechanism selected from a group consisting of hypertext transport protocol (HTTP), file transport protocol (FTP), email, java message service (JMS), instant message (IM) and short message service (SMS), each block of the first plurality of blocks having a unique identifier and being received independently of others of the plurality of blocks;
receiving a second plurality of blocks via a second transport mechanism that is different from the first transport mechanism;
receiving a key that identifies how to reconstruct data from the first plurality of blocks and the second plurality of blocks; and
reconstructing the data from the first plurality of blocks and the second plurality of blocks using the key.

17. The non-transitory computer readable medium of claim 16, the method further comprising:
decompressing the data if the data is compressed;
decrypting the data if the data is encrypted;
decompressing the first plurality of blocks and the second plurality of blocks if the first plurality of blocks and the second plurality of blocks are compressed; and
decrypting the first plurality of blocks and the second plurality of blocks if the first plurality of blocks and the second plurality of blocks are encrypted.

18. The non-transitory computer readable medium of claim 16, the method further comprising:
requesting that at least one block of the first plurality of blocks and the second plurality of blocks be retransmitted using a third transport mechanism that is different from the first transport mechanism and the second transport mechanism.

19. A computing apparatus comprising:
a splitter to divide data into a plurality of blocks, to assign a unique identifier to each of the plurality of blocks, and to generate a key that identifies how to reconstruct the data from the plurality of blocks, and
a transmitter connected with the splitter to transmit the key and a first block of the plurality of blocks to a recipient using a first transport mechanism selected from a group consisting of hypertext transport protocol (HTTP), file transport protocol (FTP), email, java message service (JMS), instant message (IM) and short message service (SMS), and to transmit a second block of the plurality of blocks to the recipient separately from the first block using a second transport mechanism that is different from the first transport mechanism.

20. The computing apparatus of claim 19, further comprising:
at least one of an encrypter connected with the splitter to encrypt at least one of the data and the plurality of blocks and a compressor connected with the splitter to compress at least one of the data and the plurality of blocks.

21. The computing apparatus of claim 19, further comprising:
a receiver to receive an additional plurality of blocks and an additional key, wherein each of the additional plurality of blocks has a unique identifier and the additional key identifies how to reconstruct additional data from the additional plurality of blocks;
the splitter to reconstruct the additional data by combining the additional plurality of blocks using the additional key; and
at least one of an encrypter, connected with the splitter to decrypt at least one of the additional data and the additional plurality of blocks, and a compressor, connected with the splitter to decompress at least one of the additional data and the additional plurality of blocks.

* * * * *